Jan. 11, 1927. 1,614,105
F. E. COMSTOCK
ATTACHABLE WIRE BASKET HANDLE
Filed Nov. 9, 1925
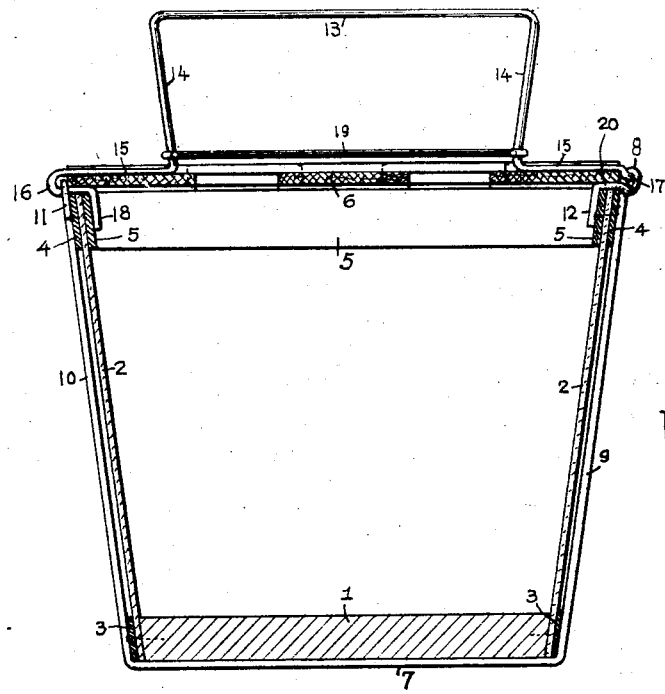
Fig.1.
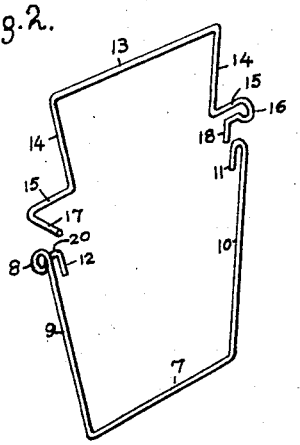
Fig.2.
Fig.3.
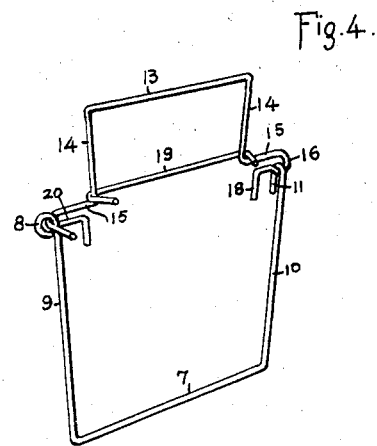
Fig.4.
Frederick E. Comstock Inventor
N. S. Amstutz
By
Attorney Patented Jan. 11, 1927.

1,614,105

UNITED STATES PATENT OFFICE.

FREDERICK E. COMSTOCK, OF VALPARAISO, INDIANA.

ATTACHABLE WIRE-BASKET HANDLE.

Application filed November 9, 1925. Serial No. 67,771.

My invention relates to improvements in attachable wire basket handles and it more especially consists of the features pointed out in the annexed claims.

The purpose of my invention is to provide a substitute for the ordinary wooden handles found on fruit baskets; that is simple in construction; that is inexpensive to make; that securely supports the basket from its underside; that firmly holds the cover in place on the basket; and that, if desired, locks the removable handle in place against accidental misplacement.

With these and other ends in view, I illustrate in the accompanying drawing such instances of adaptation as will disclose the broad underlying features of my invention without limiting myself to the specific features shown thereon and described herein.

Figure 1 is an elevation in transverse section of a basket, showing the cover assembled and the handle in position.

Fig. 2 is a perspective view of the handle itself.

Fig. 3 is a perspective view of the bail portion that passes beneath the basket and vertically along both sides.

Fig. 4 is a perspective view showing the bail and the handle assembled.

In practically carrying out my invention, I may adapt the same to any desired form of basket, regardless of its size or shape. In the drawing a basket is shown in cross section having a bottom 1 and sides 2 held in place by bottom bands 3, and reinforced at the top by outer bands 4 and inner bands 5. The usual cover 6 is placed on top of the sides and is held in place by my attachable handle 13.

The handle 13 serves to hold the cover 6 against vertical or sidewise displacement. It cooperates with a bail that passes beneath the basket, whose horizontal member 7 is joined to vertical extensions 9 and 10 that engage the bottom band 3 and the outer band 4 at the upper edge of the basket. The upstanding portion 9 of the bail has an eye 8 formed near its upper end which terminates in a horizontal portion and a hook 12. This horizontal portion of the hook engages the top edge of one of the sides 2 and bands 4 and 5 and passes downward on the inside of the band 5.

The other upstanding end 10 of the bail has a loop 11 formed approximately at right angles to the eye 8, its opening being about on the plane of the upper edge of the basket.

The handle 13 has two end portions 14 that lead into base portions 15 which lie approximately on the same horizontal plane as the handle portion 13. At the one end of the handle, the horizontal portion 15 forms a loop 16 which terminates in a hook 18. The horizontal portion of the hook 18 engages the upper edge of the outer band 4, the side 2 and an inner band 5, as shown in Fig. 1. At the other end of the handle, the horizontal portion 15 terminates in a right angled hook 17 which enters the eye 8 as the handle is swung laterally. After the loop 16 of the handle 13 has been passed through the loop 11 of the bail, the two loops form a universal hinge for the handle 13.

In attaching my device I first place the basket in the bail, as shown in Fig. 1, then place the cover in position on the basket, and thereafter insert the hook 18 through the loop 11 so that the hook end 18 is pressed against the inner band 5 as the handle 13 is lowered, so as to bring the hook 17 in line with the eye 8 when a sidewise movement of the handle will pass this hook through the eye and thus securely hold the cover in place on the basket, and also serve as a means for carrying the basket.

If desired, after the hook 17 has been passed through the eye 8, the hook may be bent upward so as to prevent its accidental withdrawal from the eye and the consequent loosening of the handle.

It is obvious that a disengagement of the hook 17 from the eye 8 will free this end of the handle 13 so that it may be swung on its loop 16 more than 180 degrees. This will leave it suspended in the loop 11 alongside of the basket, which will free the cover 6 so that the contents of the basket may be removed. The basket can be reused as often as desired by replacing the cover and again bringing the handle up over the top as before. It will be noted that the hook ends 12 and 18, which engage the inner bands 5, securely hold my device on the basket, and the horizontal portions 15 of the handle firmly hold the cover on the basket. If it is desired to further prevent the handle from being accidently loosened from the eye 8, a locking strip 19 having hook ends formed thereon may be slipped over the sides 14 of the handle so as to rest on the horizontal portions 15. The member 19 cannot raise up because the sides 14 of the handle 13 are bent outward at an angle.

If desired, the eye 8 may be formed below the level of the basket rim, and the hook end 17 bent downward accordingly so as to pass into the eye. If the straight portion 20 is separated from the bail end 9 a little more than the thickness of the wire 15, it is obvious that when the basket is to be used without the cover, and the handle 13 is at rest, it cannot be accidentally unhooked sideways from the eye 8 because the wire 15 will engage the wire 20. The eye being more or less elongated in a vertical direction will permit a hook 17 and its connected portion 15 to drop onto the upper rim of the basket when the cover is removed, and thus serve the same purpose as though the eye itself were placed on a lower plane.

From the description it will be seen that the attachment and the detachment of the handle can be readily and quickly accomplished with a certainty that makes the use of my device a practical necessity.

What I claim is:

1. In attachable handles for baskets, a cover, a bail passing beneath the basket and terminating on one side approximately level with the top of the basket in an eye having a hook end extension thereto and the other end of the bail terminating in a loop on about the same plane, a removable handle having a loop adapted to engage the loop of the bail and having a hook end for engaging the inside of the rim of the basket, and a hook formed on the other end of the handle adapted to engage the eye of the bail so as to firmly hold a basket cover between the handle and the upper rim of the basket.

2. In wire basket handles, a suitable basket body, a bail passing adjacent one side beneath the bottom and upward adjacent the other side having one of its ends terminating in a loop and the other in an eye, a hook formed adjacent the eye, a handle having a loop at one end which terminates into a straight portion with a downwardly bent hook, a cover positioned above the hook end of the bail and the hook of the handle formed near its loop, horizontal portions of the handle engaging the upper side of the cover, and means for attachably and detachably securing the other end of the handle to the eye end of the bail.

3. In wire handles for baskets, a basket body composed of sides and a bottom, a loose cover thereon adapted to rest on the sides, a detached wire bail passing beneath the basket and upward adjacent each side and terminating respectively in an eye and a hook formation, and an attachable and detachable handle comprising a hook end and a loop end the latter adapted to be positioned adjacent the upper and under faces of the cover.

4. In wire handles for baskets, a suitable basket body, a bail hooked over the top of one rim of the basket and having an eye formed at this point said bail passing beneath the basket and terminating near the other rim, a cover resting on the basket and one end of the bail, a removable handle engaging the other end of the bail and having a hook portion passing beneath the cover and engaging the inside of the rim of the basket, horizontal portions of the handle engaging the upper side of the cover, and a hook on the free end of the handle for engaging the eye of the bail.

5. In wire handles for baskets, a suitable basket body, a removable bail passing beneath the basket and extending upward along each side to about the rim of the basket one end of the bail terminating in a hook adapted to be positioned adjacent the rim of the basket on its outside the other end of the bail terminating in an eye and a hook extension therefrom adapted to admit the rim of the basket between itself and the adjacent portion of the bail, a loose cover positioned above the hook extension of the bail eye, an attachable and detachable handle having its ends formed in horizontal positions adapted to engage the upper face of the cover and one of its ends provided with a hook adapted to engage the bail eye, on the other end a loop adapted to engage the bail hook said end terminating in a hook which is positioned beneath the cover and extends vertically on the inside of the basket rim.

In testimony whereof I affix my signature.

FREDERICK E. COMSTOCK.